United States Patent [19]

Abukawa et al.

[11] Patent Number: 5,033,565
[45] Date of Patent: Jul. 23, 1991

[54] MOTOR-DRIVEN POWER STEERING APPARATUS

[75] Inventors: Toshimi Abukawa, Hitachioota; Toshiaki Okuyama, Naka; Kazuo Tahara; Katsuji Marumoto, both of Hitachi; Toshiyuki Koterazawa, Hitachi; Mitsuyuki Hombu, Katsuta; Tadashi Takahashi, Hitachi; Hisatugu Ishikura, Katsuta; Hiroshisa Yamamura, Hitachioota; Toru Tatsuzaki, Hiratsuka; Tsutomu Omae, Hitachi; Shuichi Takamatsu, Hitachi, all of Japan

[73] Assignees: Hitachi, Ltd., Tokyo; Hitachi Automotive Engineering Co., Ltd., Ibaraki, both of Japan

[21] Appl. No.: 423,355

[22] Filed: Oct. 18, 1989

Related U.S. Application Data

[62] Division of Ser. No. 247,509, Sep. 22, 1988, Pat. No. 4,960,178.

[51] Int. Cl.$^5$ ............................................. B62D 5/04
[52] U.S. Cl. ..................................... 180/79.1; 322/90
[58] Field of Search ................. 180/79.1, 142; 307/16; 320/15, 16; 322/90

[56] References Cited

U.S. PATENT DOCUMENTS

| | | | |
|---|---|---|---|
| 1,782,940 | 11/1930 | Saives | 320/15 X |
| 2,152,405 | 3/1939 | Dreischerf | 320/15 X |
| 4,045,718 | 8/1977 | Gray | 307/16 X |
| 4,207,511 | 6/1980 | Radtke | 320/15 X |
| 4,517,507 | 5/1985 | Nordbrock et al. | 307/16 X |
| 4,564,799 | 1/1986 | Iwaki et al. | 320/15 X |
| 4,653,601 | 3/1987 | Nakamura et al. | 180/79.1 |
| 4,804,057 | 2/1989 | Saeed | 180/79.1 X |
| 4,960,178 | 10/1990 | Abukawa et al. | 180/79.1 |

FOREIGN PATENT DOCUMENTS 156863  2/1984  Japan ................................. 180/79.1

Primary Examiner—Andres Kashnikow
Assistant Examiner—Brian L. Johnson
Attorney, Agent, or Firm—Antonelli, Terry, Stout & Kraus

[57] ABSTRACT

A generator generates two voltage outputs which have different voltage levels. One voltage output from the generator is used for operating a power steering apparatus. Another voltage output from the generator is used for charging a battery which supplies current to other loads.

8 Claims, 5 Drawing Sheets

MOTOR-DRIVEN POWER STEERING APPARATUS

CROSS-REFERENCE TO RELATED APPLICATION

This is a division of our co-pending U.S. Pat. application Ser. No. 247,509, filed Sept. 22, 1988, now U.S. Pat. No. 4,960,178.

BACKGROUND OF THE INVENTION

The present invention relates to a power steering apparatus which depends on DC power as an energy source for generating an auxiliary steering force; and more specifically, the present invention relates to a motor-driven power steering apparatus which is profitable for a passenger car using a DC motor as an actuator for generating a auxiliary steering force.

A conventional power steering apparatus comprises a motor for generating an auxiliary steering force, a control apparatus for regulating current of the motor corresponding to the steering force, and a battery as a current source, for instance, as disclosed on FIG. 1 of Japanese Patent Laid-Open No. 59-156863 (1984), published on Sept. 6, 1984, and entitled "Power Steering Apparatus of Automobile".

The apparatus of the prior art uses a standard battery which is used in the automobile as a current power source for all electric devices thereof. However, the standard battery does not have the function of providing an output corresponding to the current value of the load of the automobile.

On the other hand, a generator for charging batteries which has two armature windings connected in star connection, respectively, for generating two similar voltages is disclosed in FIG. 3 of the U.S. Pat. No. 4,045,718, entitled "Multiple Winding Multiple Voltage Alternator Electrical Supply System".

In the conventional power steering apparatus sufficient consideration is not given to the large current consumption of the motor for generating an auxiliary steering force and the affect thereof an other electrical systems in the vehicle. Especially, the conventional power steering apparatus has a drawback in that the illumination provided by the headlights of the automobile is reduced and the electrical devices mounted on the vehicle, such as lights, wiper, and air-conditioner, etc. are undesirably influenced by the steering of the wheel at night when the automobile stops or while the engine is idling.

SUMMARY OF THE INVENTION

An object of the present invention is to provide a motor-driven power steering apparatus which can operate properly without exerting a bad influence upon other electrical devices which use the same battery in the automobile.

The object of the present invention is attained in such a manner that two different DC voltages are output from a generator driven by the engine which is equipped for charging at least one battery, one DC voltage from the generator being supplied to the power steering, while the other DC voltage therefrom is supplied to a battery used for other electrical devices mounted on the automobile.

According to the present invention, since separate DC voltages are supplied from different electric power systems to the power steering system and to the other devices in the electrical system, respectively, the other electrical devices are not affected by the operation of the power steering apparatus. And further, since the supplied voltage to the power steering system can be increased without being affected by other electrical apparatuses mounted on the automobile, the operation of the power steering system can be reliable.

DETAILED DESCRIPTION OF THE PREFERRED EMBODIMENTS

Figure 1:
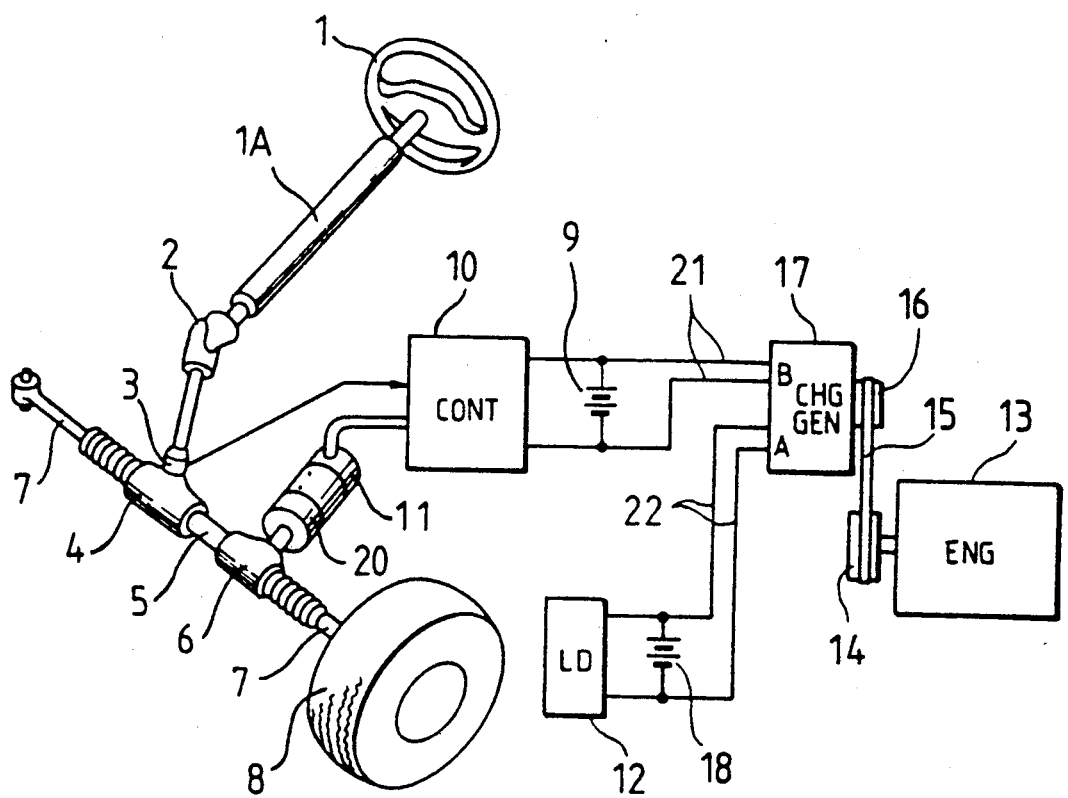
FIG. 1 shows the first embodiment of the present invention.

Referring to FIG. 1, a steering shaft 1A, which is rotatable freely by the steering wheel 1, is connected to a gear box 4 of a gear rack 5 through an universal joint 2. The rotating force of the steering shaft 1A is transmitted to the gear rack 50 through the gear box having a pinion gear (not shown) which is rotated by the universal joint 2.

A torque detector 3 is mounted on the gear box 4 for detecting the torque of the steering shaft 1A. The detected output of the torque detector 3 is input to a controller 10.

A tie rod 7 is connected to the respective ends of the gear rack 5. The steering of the wheel 8 takes place by the operation of the gear rack 5 and the tie rod 7, as is well known.

A gear box 6 of the gear rack 5 is connected to a motor 11 through a reducer 20. The motor 11 is driven by a control signal of the controller 10.

A pulley 14 is fixed on the rotational axis of the engine 13. A pulley 16 is fixed on the rotational axis of a generator 17. A belt 15 is suspended between the pulley 14 and the pulley 16. The generator 17 has first output terminals 21 and the second output terminals 22. Batteries 9 and 18 are connected to these output terminals 21 and 22, respectively. The controller 10 is connected to the output terminals of the battery 9. Most other electrical loads 12 of the vehicle are connected to the output terminals of the battery 18.

When the steering wheel 1 is operated, the torque detector 3 detects the torque of the steering shaft 1A to input a detecting signal to the controller 10. The motor 11 is driven by a control signal from the controller 10, and gives the auxiliary steering force to overcome the road surface friction generated between the wheel 8 and the road surface.

Figure 2:
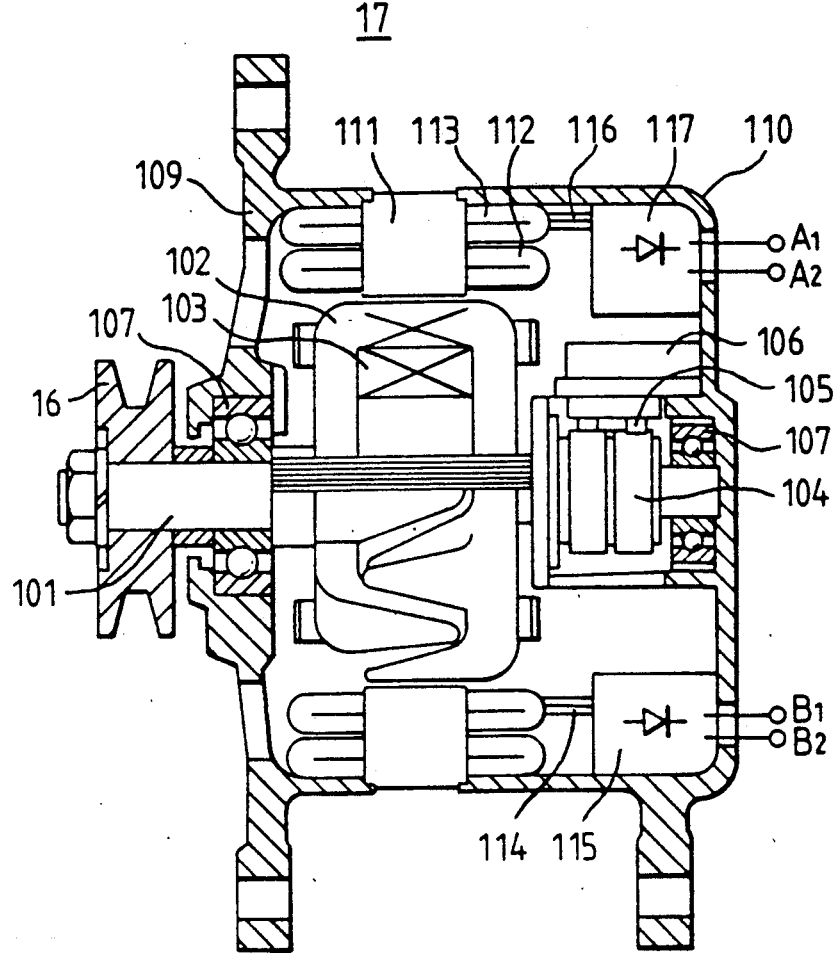
FIG. 2 shows a sectional view of the generator applied to the present invention.

Referring to FIG. 2, the generator 17 outputs a DC output voltage A of a comparatively low voltage for charging the battery 18 of 12 volts and supplying electric power to the various kinds of loads 12, and a second DC output voltage B of a comparatively high voltage (48 volts) for driving the motor 7 of the power steering system. The generator comprises two sets of armature windings 112 and 113 and two sets of rectifiers (diodes) 115 and 117. Other than that, the generator is almost the same as a standard generated (called an AC dynamo). The pulley 16 is connected to the shaft 101 which is suspended by two sets of bearings. The rotor is formed by the iron core 102 of rundle configuration and the field winding 103 is mounted on the shaft 101.

The field winding 103 is connected to the outside through a slip ring 104 and a brush 105. A predetermined exciting current is supplied from a voltage regulator (not shown). As a result, a three-phase AC voltage is generated by the armature windings 112 and 113 when the engine 13 is driven. The three-phase AC voltage is supplied to the rectifiers 115 and 117 through lead wires 114 and 116. First and second DC voltages are generated at the terminals $A_1$ and $A_2$ of the rectifier 117 and the terminals $B_1$ and $B_2$ of the rectifier 115, respectively. In FIG. 2, 106 denotes a brush holder, 109 and 110 brackets, and 111 armature iron.

Figure 3:
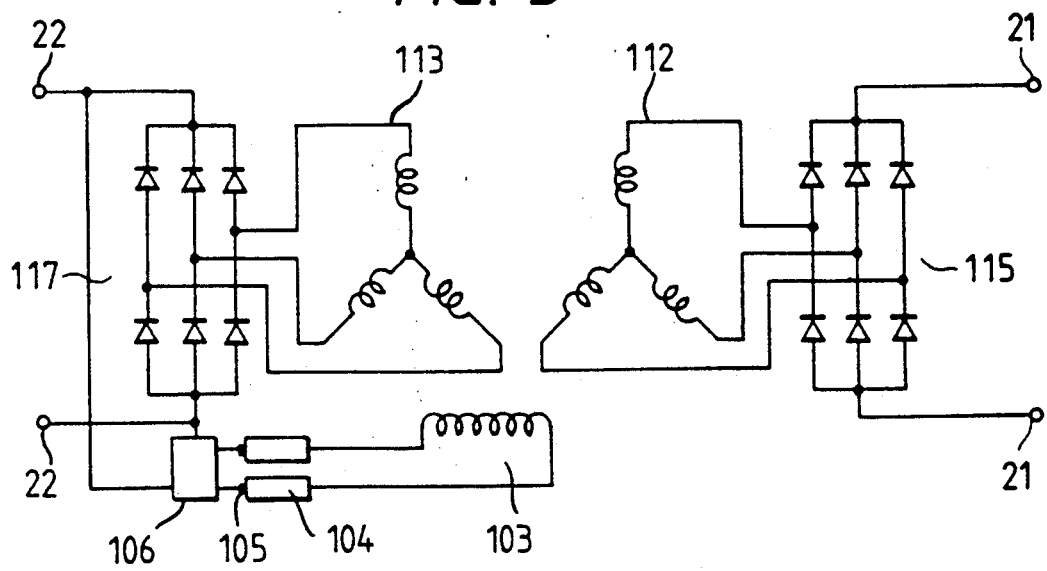
FIG. 3 is a circuit diagram of the generator shown in FIG. 2

Referring to FIGS. 2 and 3, two sets of armature windings are arranged independently in electrical structure, and the field winding 103 is arranged in common to supply flux to two sets of armature windings 112 and 113.

In the embodiment shown in FIG. 1, the battery 9 constitutes the first voltage supplier, and the battery 18 constitutes the second voltage supplier.

When a driver operates the steering wheel 1, the steering shaft 1A is driven rotatably. The torque caused by the rotational movement of the steering shaft 1A is detected by the torque detector 3. The detected signal is input to the controller 10 from the torque detector 3. The controller 10 inputs the electric power of the battery 9 and supplies it to the motor 11 at a level corresponding to the detected signal, and the motor 11 supplies an auxiliary steering force corresponding to the detected signal. Since the general load 12, such as the lights, the ignition system, etc. is connected to the battery 18, for instance, the intensity of illumination of the head lights is not decreased by the operation of the motor-driven power steering apparatus. Accordingly, the safe operation of the automobile is not affected by the operation of the motor-driven power steering apparatus when the automobile is running at night or through a tunnel.

Since the voltage of the first output terminals 21 is set at a high voltage level, current flowing through a semiconductor element of the power steering apparatus connected to the first output terminal 21 can be reduced so that the semiconductor element can be miniaturized and the cost of manufacture thereof can be reduced. The battery 9 as the voltage supplier is able to connect to the power steering apparatus by changing the specification of the armature winding (turn and diameter of winding) of the generator 17, so that the size of the apparatus does not become large and the cost of producing the apparatus can be reduced.

Figure 4:
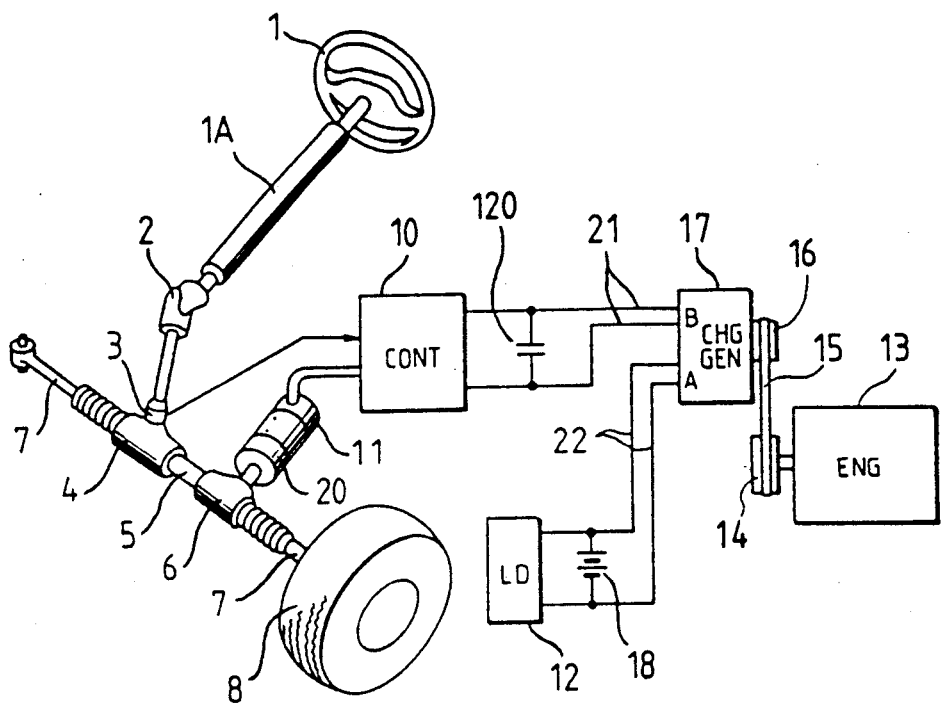
FIG. 4 shows the second embodiment of the present invention.

Referring to FIG. 4, a condenser 120 is used in the embodiment as the first voltage supplier instead of the battery 9 used in the embodiment of FIG. 1. In the embodiment shown in FIG. 4, the condenser 120 has the effect of absorbing the noise caused by switching of the semiconductor element of the controller 10. Other structure, operation and effect of the embodiment shown in FIG. 4 is same to that of FIG. 1.

According to the embodiments shown in FIGS. 1 and 4, the power source to other electric parts is not changed; for instance, the intensity of the illumination of the head lights is not reduced by the operation of the motor-driven power steering apparatus. And also, the motor-driven power steering apparatus can be supplied in small size and low manufacturing cost.

Figure 5:
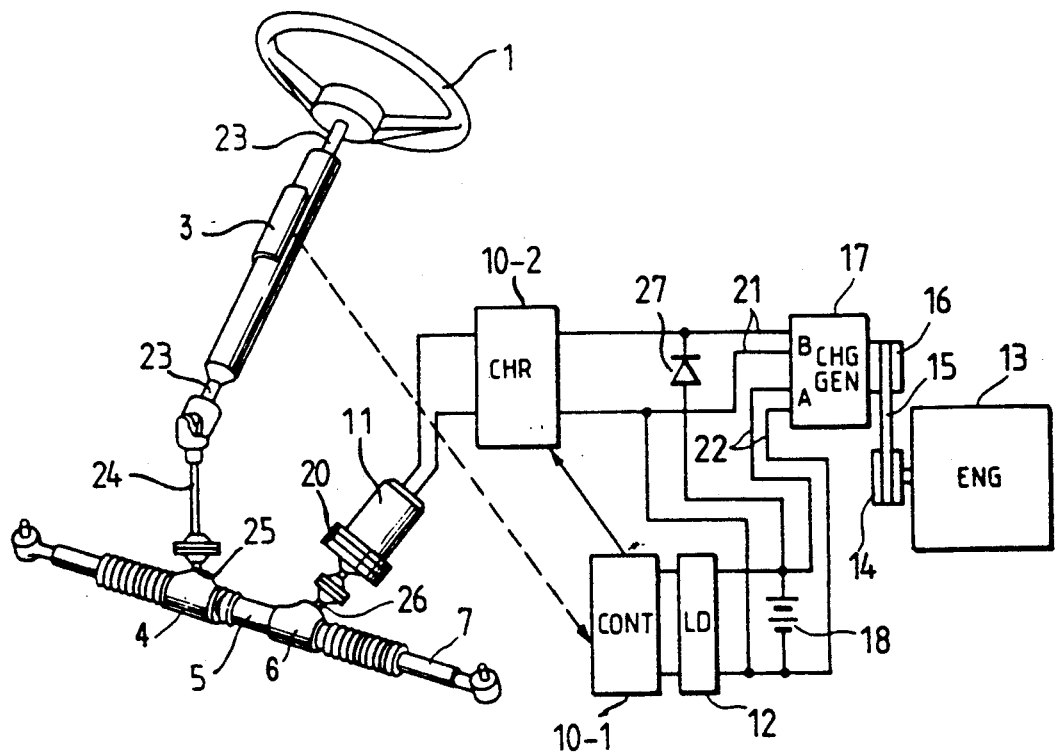
FIG. 5 shows the third embodiment of the present invention.

FIG. 5 shows one embodiment of the present invention applied to a rack and pinion system. Referring to FIG. 5, 1 denotes the steering wheel, 23 a steering shaft, 24 a middle shaft, 25 a pinion, 7 a rack shaft, 4 a steering gear box, 11 a DC motor in high voltage specification as an actuator for generating an auxiliary steering force, 20 a reducer, 26 a pinion for the auxiliary steering force, 3 a torque detector, 10-1 a chopper controller, 12 electrical devices mounted on the vehicle (load), 13 an engine, 14 and 15 pulleys, 15 a belt, 17 a generator for charging a battery, 18 a battery, 10-2 a chopper, and 27 a diode.

When the steering is carried out by turning the steering wheel 1, the gear rack 5 held slidably within the steering gear box 4 is moved through the pinion 25 along the axial direction of the gear rack, and a torque is applied to the steering shaft 23, the torque is detected by the torque detector 3, and a signal is generated corresponding to the torque. The signals from the torque detector and a steering angle sensor (not shown) are input to the chopper controller 10-1, which outputs a control signal to the chopper 10-2 to generate a predetermined torque by controlling the power supplied to the motor 11. The torque is applied to the gear rack 5 through the reducer 20, the pinion 26 and gem bag 6. Thereby, an auxiliary steering force is generated in the motor-driven power steering apparatus.

Figure 6:
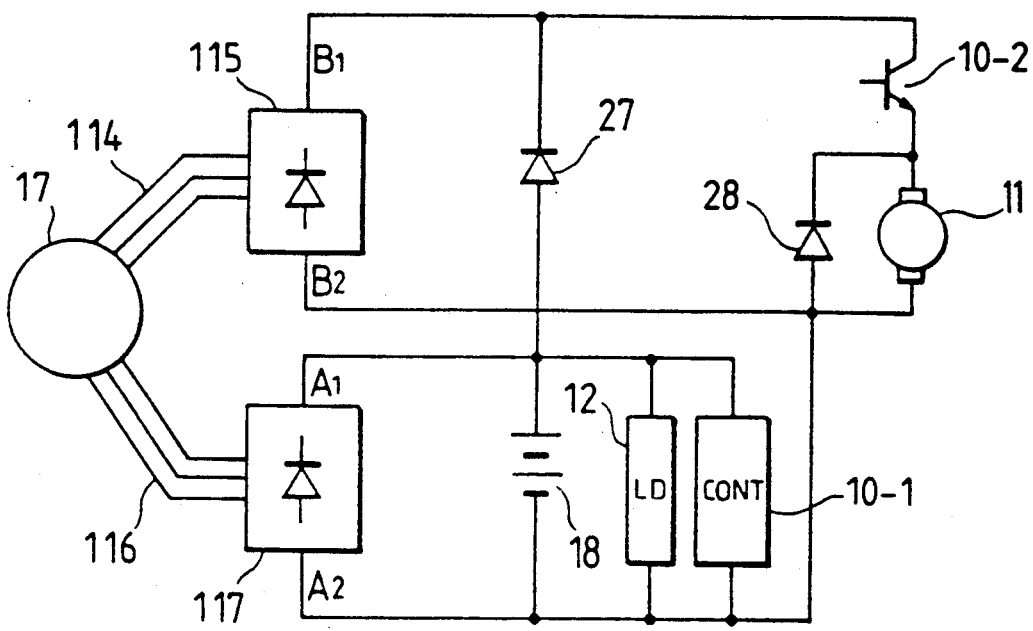
FIG. 6 is a circuit diagram of the third embodiment shown in FIG. 5.

FIG. 6 is a circuit diagram of a motor-driven power steering apparatus forming one embodiment of the present invention. Referring to FIG. 6, the chopper 10-2, which is shown as a switching transistor therein, is connected to the motor 11 in series and is connected directly to the DC output (high voltage) of the rectifier 115, which is powered from generator 17 through the lead wire 114. A flywheel diode 28 is connected across motor 11. On the other hand, the DC output (low voltage), which is obtained as an output of the rectifier 117 from the armature winding 113 of the generator 17 through the lead wire 116, is connected to the battery 18 and the load 12 in parallel to supply electric power to them, and also is connected to the DC output from rectifier 115 through the diode 27 of the blocking inverse current type. Although a control circuit is necessary for changing over the rotational direction of the motor 11 reciprocally, the control circuit is not shown in FIG. 6.

Figure 7:
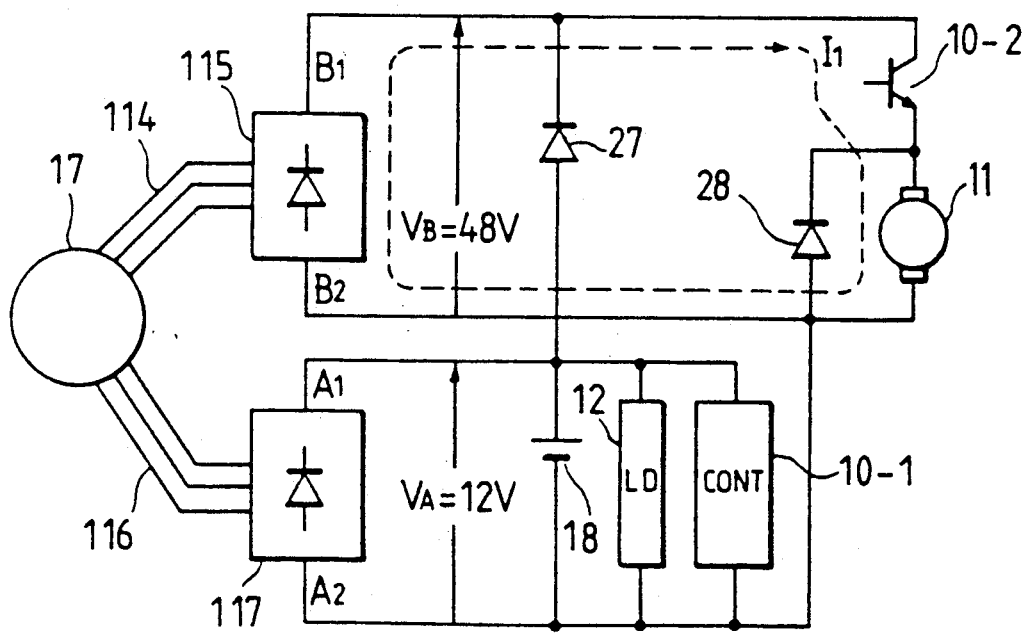
FIG. 7 is a diagram for explaining the operation of the circuit shown in FIG. 6 when a predetermined voltage is obtained from the generator by rotation of the engine.

The power supply source for driving the motor which generates the auxiliary power steering force, is changed over automatically depending on the running or stopping of the generator 17 for generating a predetermined electric power, since the diode 27 is provided in the embodiment shown in FIG. 7. Hereunder, we will explain the operation of the circuit shown in FIG. 6 referring to FIGS. 7 and 8.

Referring to FIG. 7, the generator 17 generates the voltage $V_B = 48$ volts via rectifier 115 and the voltage $V_A = 12$ volts via rectifier 117 with the revolution of the engine 13. The diode 27 is turned OFF by reverse biasing. The rectifier 115 supplies the voltage $V_B$ to the motor 11. The chopper 10-2 is operated by the control signal from the chopper controller 10-1 so that the motor 11 is supplied with a predetermined current $I_1$, to provide a predetermined auxiliary steering force. At this time, since the voltage specification of the motor 11 is 48 volts, the current $I_1$ for generating a required auxiliary steering force is reduced to ¼ compared with a conventional motor which is excited by 12 volts.

Figure 8:
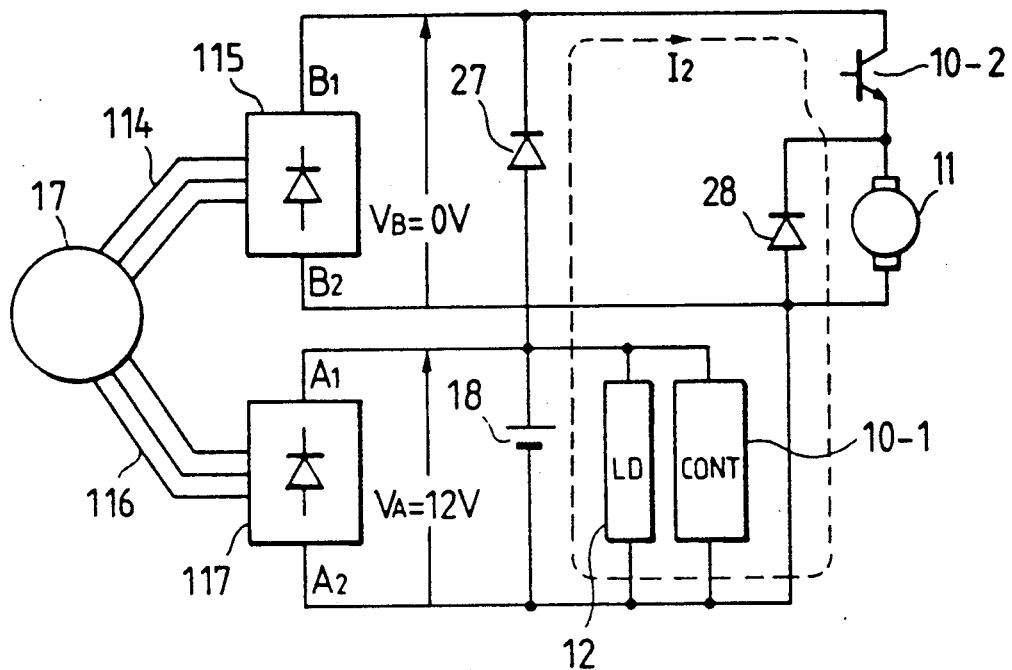
FIG. 8 is a diagram for explaining the operation of the circuit shown in FIG. 6 when the engine stops.

Referring to FIG. 8, the output of rectifier 115 and the output of rectifier 117 are zero, since the generator 17 is not driven by the engine 13. Therefore, the voltage $V_A$ is 12 volts as a result of the battery 18. At this time, the diode 27 is caused to be forwarded biased. When the chopper 10-2 is operated by the chopper controller 10-1, the electric power $I_2$ is supplied to the motor 11 from the battery 18 so that the motor 11 generates a torque to supply an auxiliary steering force. At this time, the motor 11, which has a voltage specification of 48 volts, is driven by the voltage of 12 volts supplied from the battery 18 so that the response speed of the motor is insufficient. However, the magnitude of the current $I_2$ can be maintained equivalently to an approximate same value by changing the duty ratio of the current flowing through the chopper provided as transistor 10-2. Consequently, the same auxiliary steering force can be obtained in case of FIG. 8 as provided in the case of FIG. 7. At this time, there is no problem with the generator 17, since reverse current to the generator 17 is blocked by the rectifiers 115 and 117, as well known.

In the embodiment, the output voltage of the generator 17 is selected to be 12 volts at the first DC output and 48 volts at the second DC output, respectively. A transistor is used as the chopper in the described embodiment; however, a gate turn-off transistor, a thyristor, or field effect transistor (FET), etc. can be used instead. Also, the DC motor 11 is used as an auxiliary steering force generating actuator. However, the invention is not limited to use of the DC motor. For instance, an AC motor such as induction motor, a brushless type motor (synchronous motor) of a DC motor, or other motors can be used instead. Of course, any other DC motors can be employed without respect to their magnetic field types.

Figure 9:
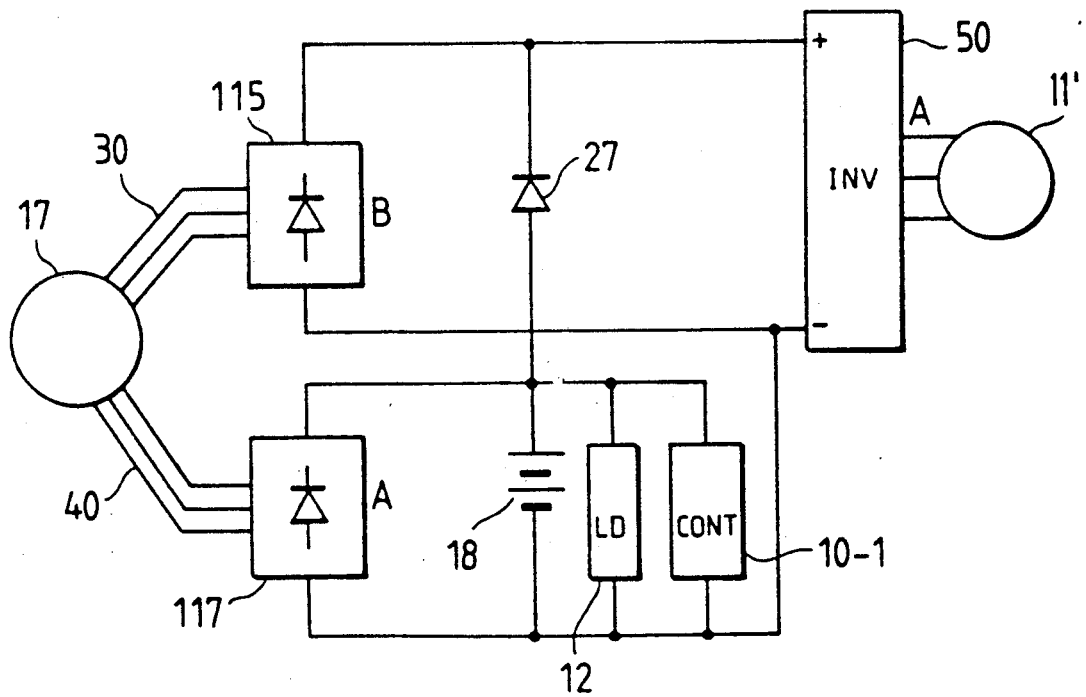
FIG. 9 shows the 4th embodiment of the present invention.

FIG. 9 shows one embodiment of the present invention in which a brushless DC motor is employed as an actuator for generating an auxiliary steering force. In FIG. 9, the same parts as in FIG. 6 are indicated by the same reference symbols. The difference between FIG. 9 and the previous embodiment in FIG. 6 is that the second DC output B, namely an output of high voltage, is connected to the synchronous brushless DC motor, 11 through an invertor 50; and common earth wires of the inverse current blocking diode 27 and the high and low voltage rectifiers are equipped between the invertor 50 and the rectifier 115.

In the embodiment shown in FIG. 9, the chopper can be omitted, and the brushless DC motor can be operated by the high voltage rectifier 115 during running of the engine and by the battery 18 when the engine is not running. Incidentally, the motor 11 can be an induction motor, instead.

In the embodiments, the motor of the motor-driven power steering is connected as a high voltage load. The present invention is not limited thereto. For instance, when an ignition system is connected to the high voltage rectifier 115, it can resolve a drawback that the voltage of the ignition device is not increased based on a short ignition duration when an automobile is running at a high speed. Further, when all of the general motors, such as the car cooler motor, are connected to the high voltage side of the generator, the motor current can be reduced.

According to the embodiments shown in FIGS. 5 and 9, the chopping transistor and the motor can be driven by high voltage when the engine is running, and the current flowing through the motor can be reduced in proportion to the magnitude of a reciprocal of a ratio of the high voltage to the low voltage of the generator 17. Since the general load and the control apparatus are driven by the low voltage battery which is equipped separately from the high voltage battery used for the motor-driven power steering, the intensity of the light is not reduced when the automobile is driven at night.

Since the apparatus shown in FIG. 9 does not need the build-up chopper shown in FIG. 6, it has a long durability and becomes a compact system.

According to the embodiments shown in FIGS. 6 and 9, since the motor-driven power steering motor can be driven by low current when the engine is not running, the power steering can be driven when the automobile is transported by a wrecker truck in the event of an engine failure.

In the embodiments of FIGS. 1, 4 and 5, the present invention is applied to the motor-driven power steering apparatus. However, the present invention also can be applied to a motor-driven oil pressure type power steering apparatus.

What we claim is:

1. A motor driven power steering apparatus for a vehicle which depends on a D.C. power source as an energy source for electrical devices mounted on the vehicle, and which produces an auxiliary steering force in response to the torque applied to the steering column of the vehicle, comprising:
   means for supplying a first D.C. voltage at a first voltage level;
   means for supplying a second D.C. voltage at a second voltage level which is lower than said first voltage level; and
   actuator means for generating an auxiliary steering force for the vehicle, including a motor for supplying the auxiliary steering force and current control means for controlling current supplied to said motor to control said auxiliary steering force;
   said current control means including a chopper device connected to said motor and said first D.C. voltage supplying means for controlling the current supplied to said motor and a chopper controller connected to said second D.C. voltage supplying means for controlling said chopper device in accordance with torque applied to the steering column of the vehicle.

2. An apparatus according to claim 1, wherein said second D.C. voltage supplying means includes a battery connected to supply energizing voltage to said chopper controller.

3. An apparatus according to claim 2, further including a diode connected between said battery and said first D.C. voltage supplying means and having a polarity so as to be biased to non-conduction by the higher voltage level of said first D.C. voltage, whereby, in the absence of said first D.C. voltage, said chopper device is powered from said battery via said diode.

4. An apparatus according to claim 1, wherein said first D.C. voltage supplying means and said second D.C. voltage supplying means are each powered from a generator driven by the engine of the vehicle.

5. An apparatus according to claim 1, wherein said first D.C. voltage supplying means and said second D.C. voltage supplying means are both powered from the same generator driven by the engine of the vehicle.

6. An apparatus according to claim 5, wherein said generator includes means for generating a second output having a predetermined voltage level for charging said battery and means for generating a first output having a voltage level higher than said predetermined voltage level.

7. A motor driven power steering apparatus for a vehicle which depends on a D.C. power source as an energy source for electrical devices mounted on the vehicle, comprising:

a battery connected to supply a first voltage at a first level to said electrical devices of the vehicle;

a power source supplying a second voltage at a second level which is substantially higher than said first level; and actuator means for generating an auxiliary steering force for the vehicle, including a brushless motor for supplying the auxiliary steering force and current control means connected to said brushless motor for controlling current supplied to said brushless motor to control said auxiliary steering force;

said current control means including an inverter connected to said power source and to said brushless motor for supplying current to said brushless motor.

8. An apparatus according to claim 7, further including a diode connected between said battery and said power source with a polarity so as to be biased to non-conduction by said second voltage level, whereby, when said power source is not supplying said second voltage, said inverter is powered from said battery.

* * * * *